United States Patent [19]

Tono et al.

[11] Patent Number: 5,006,639

[45] Date of Patent: Apr. 9, 1991

[54] METHOD OF COAGULATING SLUDGE

[75] Inventors: Show Tono, Tokyo; Toshiyuki Miki; Yoshihide Dairokuno, both of Kanagawa; Jyun Kataoka, Chiba, all of Japan

[73] Assignee: Aoki Corporation, Osaka, Japan

[21] Appl. No.: 295,796

[22] Filed: Jan. 11, 1989

[30] Foreign Application Priority Data

Jun. 10, 1988 [JP] Japan ................... 63-142946

[51] Int. Cl.$^5$ ................................ C02F 1/56
[52] U.S. Cl. ...................... 210/727; 210/728; 210/732; 210/734
[58] Field of Search ............ 210/726, 727, 728, 729, 210/732, 770, 733, 734

[56] References Cited

U.S. PATENT DOCUMENTS

| | | | |
|---|---|---|---|
| 2,798,609 | 7/1957 | Smith et al. | 210/770 |
| 3,259,570 | 7/1966 | Priesing et al. | 210/727 |
| 3,397,139 | 8/1968 | Sak | 210/727 |
| 4,479,879 | 10/1984 | Hashimoto et al. | 210/727 |
| 4,681,688 | 7/1987 | Sondov et al. | 210/770 |

FOREIGN PATENT DOCUMENTS 58112097 12/1981 Japan ................... 210/727

*Primary Examiner*—Stanley Silverman
*Assistant Examiner*—Krisanne Shideler
*Attorney, Agent, or Firm*—Wenderoth, Lind & Ponack

[57] ABSTRACT

The present invention provides a method of coagulating sludge, which comprises adding sequentially an anionic polymer coagulant and a cationic polymer coagulant to sludge, and furthermore, adding an anionic polymer coagulant.

According to the present invention, it is possible to coagulate sludge at a far higher efficiency with a far smaller dewatering load than in the typical conventional methods using an inorganic salt and a pH adjusting reagent.

2 Claims, No Drawings

METHOD OF COAGULATING SLUDGE

FIELD OF THE INVENTION

The present invention relates to a method of coagulating sludge, and more particularly, to a novel method of coagulating sludge, which permits settlement and coagulation of sludge produced from a river, a lake or an engineering work site at a high efficiency to largely facilitate dewatering and solidification.

DESCRIPTION OF THE PRIOR ART

Various methods have conventionally been tried to treat contaminated water containing sludge accumulated in, or floating on a river or a lake, or sludge resulting from engineering works. It is the usual practice for treating such slude to cause sludge to settle by adding an inorganic or polymer coagulant or a supplementary reagent, and to do dewatering and solidification of the resultant coagulum for rejection or reuse.

However, these conventional methods have not been very successful in terms of permitting sludge treatment at a low cost through highly efficient settlement and coagulation of sludge.

Although many coagulants and supplementary reagents have been developed and methods of their application have been examined from various points of view, it is not as yet possible to conduct an industrially large-scale treatment at a low cost.

With a view to solving problems under such circumstances, the present inventors carried out extensive studies to clarify problems in the prior art and to develop a solution. As a result, the present inventors found the following important fact, and completed the present invention.

More specifically, in the conventional sludge treating methods, sludge to be covered has been believed to be negatively charged in general, so that a practice has been adopted of adding a cationic inorganic salt such as iron and aluminum or a cationic polymer coagulant to cause coagulation of sludge particles into flocks, and then adding an anionic supplementary reagent to cause settlement of the flocks.

However, whenever, a cationic coagulant or an anionic supplementary reagent may be employed, disposal of the large quantity of flocks having a high water content in the conventional methods has absolutely required mechanical dewatering by means of filter press or a belt press. In the absence of this mechanical dewatering, such disposal has required a large space of land, solidification requiring a long period of time, and even once solidified, rainfall has caused swelling before treatment.

Another problem in the conventional methods was that the use of an inorganic salt rendered pH of supernatant liquid acidic, and neutralization thereof required a considerable cost.

The present inventors found, on the other hand, it very effective first to add an anionic polymer coagulant to sludge, and then to add a cationic polymer coagulant, in contrast to the conventional, general understanding and considering that settlement and coagulation of sludge were caused, not by a simple ionic bond of positive and negative ions, but by a complicated mechanism in a colloidal state.

OBJECT OF THE INVENTION

The present invention was achieved on the basis of the above-mentioned finding, and has object to provide a novel method of coagulating sludge, which permits improvement of the conventional methods, settlement and coagulation of sludge at a high efficiency, and considerable reduction of the burden of mechanical dewatering and solidification.

More particularly, the present invention has an object to provide a new method for using polymer coagulants contrary to the conventional practice, and a method of coagulating sludge permitting a large-scale treatment at a high efficiency and a lower cost with the use of such a new method.

These and other objects, features and advantages of the invention will become more apparent in the detailed description and examples which follow.

DETAILED DESCRIPTION OF THE INVENTION

The present invention provides a method of coagulating sludge, which comprises adding sequentially an anionic polymer coagulant and a cationic polymer coagulant to sludge, and furthermore, adding an anionic polymer coagulant after addition of the above-mentioned coagulants.

On the assumption of the conventional established theory that sludge is negatively (−) charged, the present invention comprises first adding an anionic polymer coagulant to negatively charged sludge to promote negative charge of sludge as a whole, and the adding a cationic polymer coagulant to rapidly accelerate settlement of flocks. First addition of the anionic polymer coagulant causes the state of charge of sludge particles and the colloidal state to change, and the following addition of the cationic polymer coagulant is considered to allow settlement in bulk.

When the supernatant liquid shows a somewhat high turbidity after addition of the cationic polymer coagulant, further addition of an anionic coagulant permits complete settlement, thus giving a clear supernatant liquid.

A typical anionic polymer coagulant applicable in the present invention is in general 0.1% pure aqueous solution with pH of from 6 to 8, and viscosity of at least 100 cp (25° C., a B-type rotary viscosimeter, 30 rpm), for preferable example, which is indicated such as an acrylamide polymer coagulant. As the cationic coagulant, any polymer coagulant with pH of from 3 to 6 such as an ester coagulant may be employed.

It is needless to mention that there is no particular limit in the kind of these coagulants. It is therefore possible to easily select the optimum coagulant, considering affinity with sludge to be treated and cost.

The amount of added coagulant, varying with the treatment specifications of batch, or continuous process, etc. and further with sludge concentration, may be about 1 to 4% relative to the amount of treatment of the assumption of a sludge concentration of about 3 to 5%. This is not of course a limitative standard.

In the present invention, it is not necessary to add a pH adjusting reagent or an inorganic salt, which is conventionally required. An appropriate additive may be added, depending upon the use of sludge after treatment, but this addition has no relationship with the essence of the present invention. It means that these are just modes of use.

Flocks settled by the method of the present invention are small in quantity and show a satisfactory dewatered condition as described above. It is therefore possible to apply spontaneous dewatering, and even when applying mechanical dewatering, the amount of treatment is less than a half that in the conventional methods, resulting in the dewatering capacity improved to about twice.

The sludge after settlement and coagulation may be transformed into cakes having a water content of up to 75% by putting it in a cloth bag or a metal net bag of about 150 mesh, without further treatment or after rejecting the supernatant liquid and leaving it for one to two days for spontaneous dewatering. Cakes may be readily rejected.

The method of the present invention is applicable both to batch and continuous treatments at an excellent efficiency through simple operations. The scope of scale of applications covers even such places handling a large quantity of water as a tunnel and a dam.

Now, examples of the present invention are described. It is needless to mention that these represent only small-scale tests, but substantially and clearly show the construction and the efficiency of the present invention among others.

EXAMPLES 1 to 3

Comparison tests of sludge settlement and dewatering were carried out on sludge-bearing water from lakes and rivers in three localities (A), (B) and (C) in Kanto area (Japan).

Sludge had a concentration of 3% and a settlement test was conducted by means of a 1000 cc glass cylinder.

In Examples 1 to 3, an anionic polymer coagulant (18 cc) and a cationic polymer coagulant (12 cc) were added in this order.

As the anionic polymer coagulant, an acrylamide polymer coagulant with pH of from 6 to 8 and viscosity of at least 140 cp was used. As the cationic polymer coagulant, an ester polymer coagulating having pH of from 3 to 5 and viscosity of at least 20 cp was employed.

In cases for comparison, a cationic (inorganic metal salt; $AlCl_3$) coagulant (6 cc) and then an anionic polymer coagulant (16 cc) were added in this sequence.

Values of the amount of settlement (cc) after the lapse of five minutes and those of the water content (%) after 24 hours dewatering are shown in Table 1. As is clear from Examples 1 to 3 of the present invention, sludge treated in accordance with the present invention has an excellent settlement property and degree of dewatering. Settlement and coagulation of sludge are rapid, and the dewatering load is very slight.

TABLE 1

| | Specimen | Amount of settlement after lapse of 5 min. (cc) | Water content (%) after dewatering of 24 hrs.[a] |
|---|---|---|---|
| Example 1 | A | 150 | 63 |
| Comparison 1 | A | 280 | 82 |
| Example 2 | B | 140 | 61 |
| Comparison 2 | B | 260 | 83 |
| Example 3 | C | 80 | 52 |
| Comparison 3 | C | 160 | 76 |

[a] Water content = $w/(100 + w) \times 100$ (%)
w: Water content (percentage of the weight of the amount of water contained in soil to soil particles).

EXAMPLE 4

In a manner similar to that in Examples 1 to 3, an anionic polymer coagulant (12 cc), a cationic polymer coagulant (12 cc) and then another anionic polymer coagulant (6 cc) were added in this order to Specimen C.

The specimen showed an amount of settlement of 80 cc after the lapse of five minutes and a water content of 57% after the lapse of 24 hours. No turbidity of the supernatant liquid was observed.

EFFECTS OF THE INVENTION

According to the present invention it is possible to coagulate sludge at a far higher efficiency with a far smaller dewatering load than in the conventional methods.

Spontaneous dewatering suffices for the purpose of dewatering sludge, and in the case of mechanical dewatering, a capacity of treatment about twice as high as the conventional one is available. It is not necessary to add an inorganic salt or a pH adjusting reagent, thus permitting large-scale sludge treatment at a low cost.

What is claimed is:

1. A method of coagulating sludge, which comprises sequentially adding to sludge an anionic polymer coagulant having a pH of 6-8, a cationic polymer coagulant having a pH of 3-6 and an anionic polymer coagulant, each of said polymers being added in a coagulating amount.

2. The method of coagulat sludge as claimed in claim 1, wherein the anionic coagulanting is an acrylamide polymer anionic coagulant and the cationic polymer coagulant is an ester polymer cationic coagulant.

* * * * *